United States Patent [19]

Frank

[11] Patent Number: 5,615,118
[45] Date of Patent: Mar. 25, 1997

[54] ONBOARD AIRCRAFT FLIGHT PATH OPTIMIZATION SYSTEM

[76] Inventor: Robert K. Frank, 80 Ram Island Dr., P.O. Box 615, Shelter Island, N.Y. 11964

[21] Appl. No.: 570,598

[22] Filed: Dec. 11, 1995

[51] Int. Cl.$^6$ .......................... G06F 165/00; G01S 13/95
[52] U.S. Cl. ............... 364/424.013; 342/26; 364/424.06
[58] Field of Search .................. 364/424.06, 442, 364/420, 444, 453, 557, 433; 340/968; 73/170.02; 342/26; 250/338.1, 338.5

[56] References Cited

U.S. PATENT DOCUMENTS

| | | | |
|---|---|---|---|
| 4,281,383 | 7/1981 | Lebrun | 364/428 |
| 5,077,558 | 12/1991 | Kuntman | 342/26 |
| 5,105,191 | 4/1992 | Keedy | 340/968 |
| 5,276,326 | 1/1994 | Philpott | 250/334 |
| 5,281,815 | 1/1994 | Even-Tov | 250/339 |
| 5,285,070 | 2/1994 | Barrett | 250/338.5 |
| 5,311,183 | 5/1994 | Mathews et al. | 342/26 |
| 5,311,184 | 5/1994 | Kuntman | 342/26 |
| 5,534,868 | 7/1996 | Gjessing et al. | 342/26 |
| 5,574,647 | 11/1996 | Liden | 364/433 |

OTHER PUBLICATIONS

Milan – Fiar Seeks System Integrator Role, Jul. 4, 1994, Aviation Week & Space Tech. pp. 67–68.
Hughes – More Wind Shear Derail Might Have Aide DC–9, Jul. 11, 1994, Aviation Week & Space Tech., pp. 24–25.
Hughes – Predictive Wind Shear Nears Service Debut, Oct. 24, 1994 Aviation Week & Space Tech. pp. 36–37.
Goodbye Yellow Brick Road – Nov. 1995 Air & Space, pp. 58–59.
Forward – Looking Windshear Radar Earns FAA Cert. Oct. 1995, Airline Pilot, p. 40.
Weather Surveillance Radar LWSR–8803 Source Not Known; Date unknown.

*Primary Examiner*—Michael Zanelli
*Attorney, Agent, or Firm*—Richard L. Miller, P. E.

[57] ABSTRACT

An onboard aircraft flight optimization system that includes an onboard performance management computer, a control display unit, an infrared probe, a temperature probe, a weather radar, an inertial navigation system, and comparing apparatus. The control display unit inputs a position remote from an aircraft into the performance management computer. The infrared probe determines temperature at the position remote from the aircraft and generates a remote temperature signal received by the performance management computer. The temperature probe determines temperature at the aircraft and generates a local temperature signal received by the performance management computer. The weather radar determines wind at the position remote from the aircraft and generates a remote wind signal received by the performance management computer. The inertial navigation system determines wind at the aircraft and generates a local wind signal received by the performance management computer. And, the comparing apparatus is disposed in the performance management computer and compares the remote wind signal with the local wind signal and compares the remote temperature signal with the local temperature signal so as to determine the position remote from the aircraft where the remote wind signal is less than the local wind signal so that an altitude can be achieved that has less head wind and is therefore more economically efficient.

45 Claims, 4 Drawing Sheets

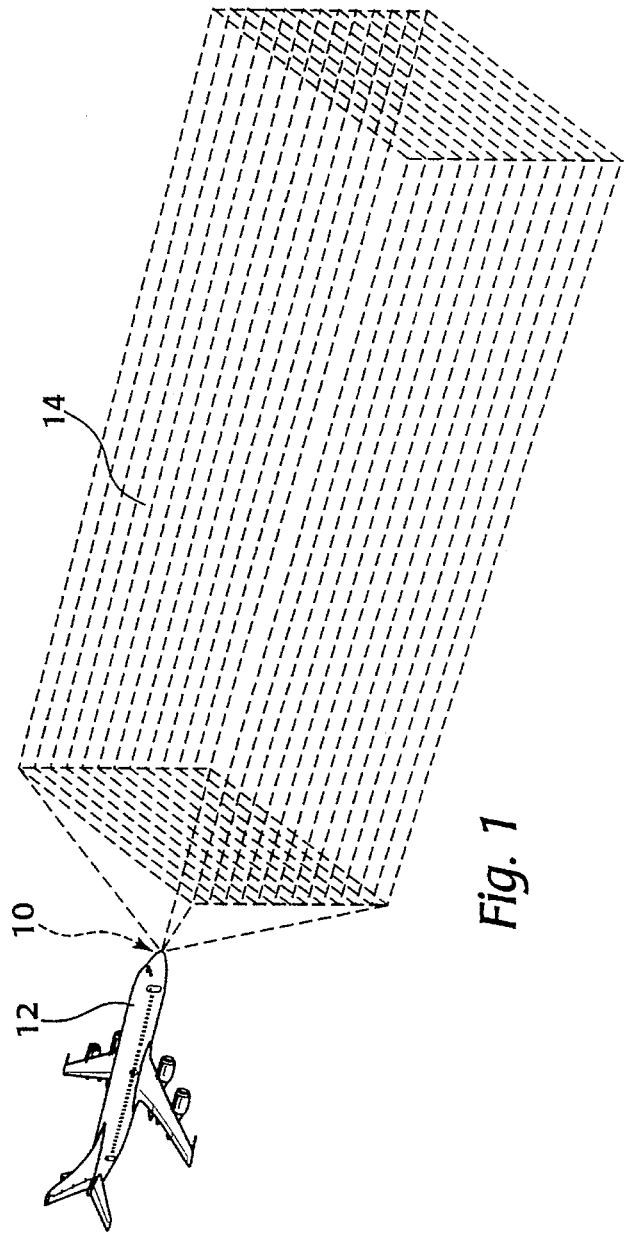
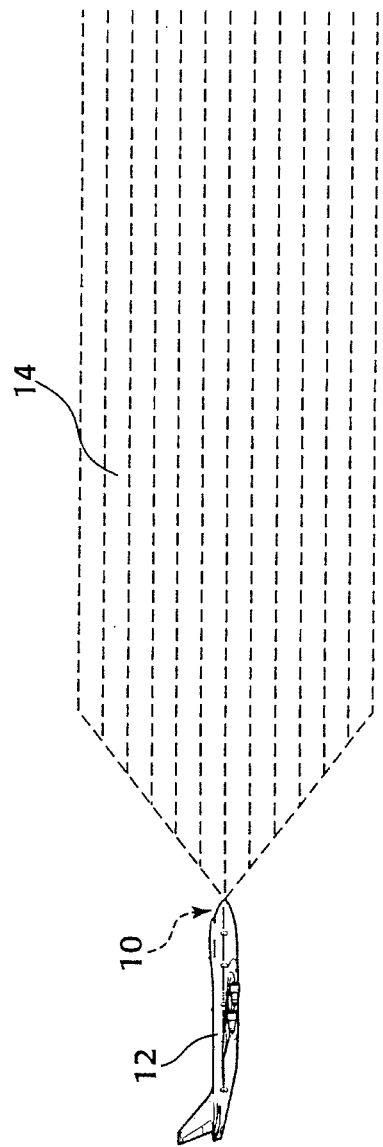

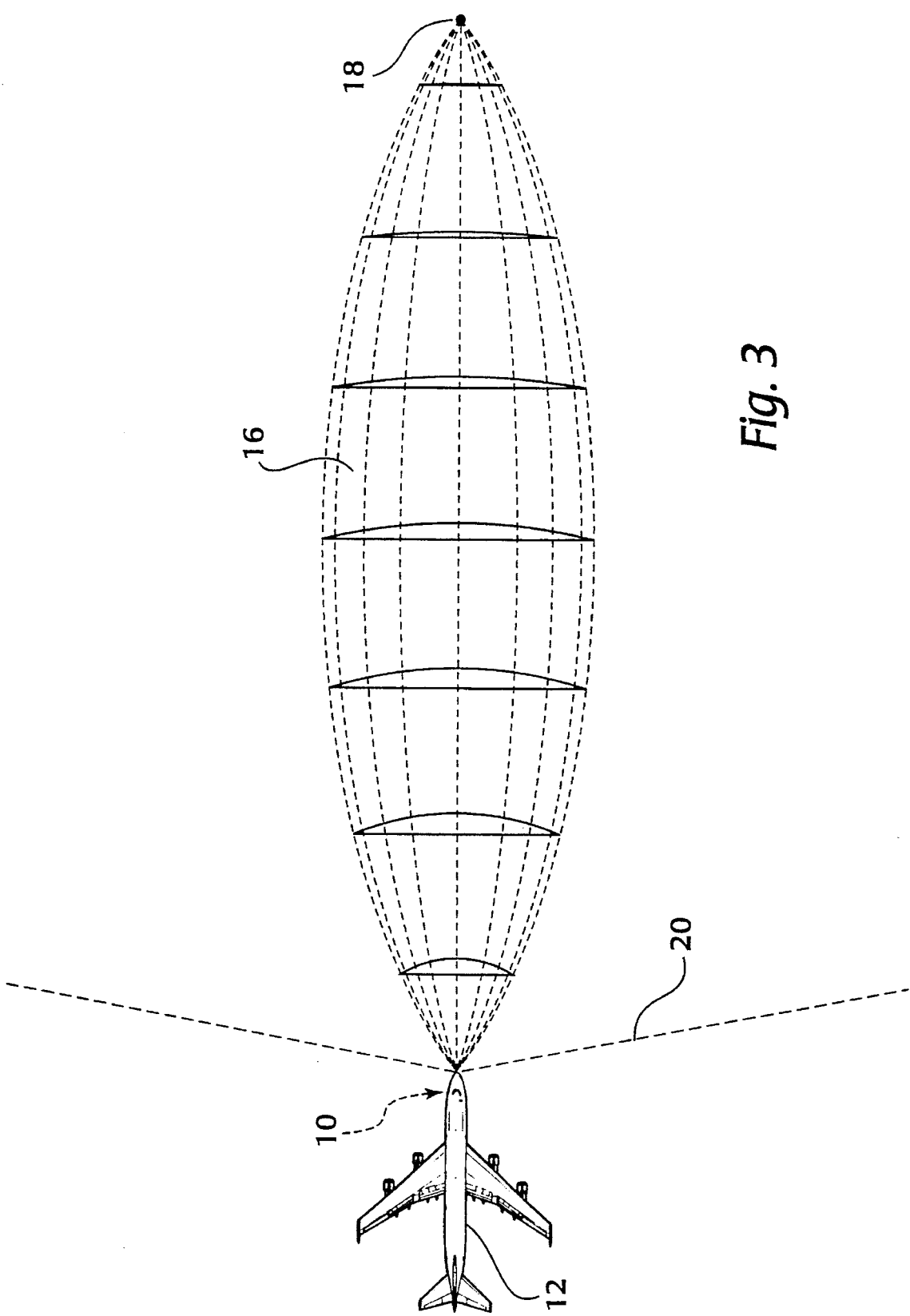

ONBOARD AIRCRAFT FLIGHT PATH OPTIMIZATION SYSTEM

BACKGROUND OF THE INVENTION

The present invention relates to an onboard aircraft flight path optimization system. More particularly, the present invention relates to an onboard aircraft flight path optimization system that includes an onboard performance management system computer, an onboard pilot keyboard for inputting the coordinates of a remote position, an onboard weather radar for determining the wind at the remote position, an onboard inertial navigation system for determining the local wind, an onboard infrared probe for determining the temperature at the remote position, and an onboard temperature probe for determining the local temperature wherein the onboard performance management system computer constantly compares the remote position wind with the local wind and constantly compares the remote position temperature with the local temperature so as to provide the most economical flight path to a destination.

Turbulence is any motion of the air other than large-scale motion. Large-scale motions are primarily horizontal and are depicted on an aircraft's constant-pressure charts. The contours or stream lines show the direction, and the isotachs the speed, of large-scale motions.

Departures from large-scale movement are called turbulence, and they may be vertical or horizontal. Turbulence first appears as large eddies. Sometimes ten miles or more in diameter, these eddies tend to break down and become progressively smaller. "Eddy" usually infers circular motion but includes all turbulent motion.

Frequently the terms "draft" and "gust" are associated with turbulence, drafts with large eddies and gusts with small eddies, but there is no distinct differences between the two. For eddies of intermediate size, the effects on an aircraft is a combination of vertical displacements (drafts) and bumpiness (gusts).

Convection is a cause of turbulence and an aircraft must adjust its operational factors accordingly.

Convective turbulence is associated with thermal instability and can be expected whenever the existing temperature lapse rate approaches the value for the dry adiabatic lapse rate (3 degrees per 1000 ft.). When unstable conditions occur in the atmosphere, any vertical motion (upward or downward) initiated in the unstable layer will continue and tend to be accelerated until it reaches the top or bottom of the layer.

The momentum of the moving air parcel carries it through the upper or lower boundary of the unstable layer, where the motion will be damped out. Vertical mixing continues through the layer, establishing an adiabatic lapse rate.

A thunderstorm provides an ideal mechanism for the development of severe to extreme convective-type turbulence. If there is a deep layer of unstable air and if sufficient lifting is available or radiational cooling aloft occurs, thunderstorms can be expected to develop.

Many synoptic conditions are known to produce thunderstorm activity including frontal, orographic, air mass, gust fronts, and microbursts.

When a typical cold front moves into an area of relatively deep, moist, and unstable air, the necessary mechanical lifting is present to generate thunderstorm activity.

Rough terrain provides mechanical lifting to air that is flowing perpendicular to the terrain, and if the air is unstable and moist, thunderstorms may occur.

Air-mass thunderstorms are produced by heating over land areas, horizontal convergence (not associated with a frontal system), or radiational cooling aloft.

The strong winds and low-level wind shears that precede thunderstorms are known as "gust fronts," "first gusts," or "plow winds." They produce wind shear events that can produce a major loss of headwind. Aircraft caught in such events can lose a substantial amount of airspeed suddenly.

Microbursts can also accompany thunderstorms. Two miles or less in diameter, microbursts are violent short-lived descending columns of air capable of producing horizontal winds sometimes exceeding 60 knots within 150 feet of the ground. They produce wind shear events that can produce a major loss of headwind and major downdrafts of air. Aircraft caught in such events can lose a substantial amount of airspeed suddenly.

Other causes of severe weather conditions include tornadoes, prefrontal squall lines, tropical cyclones, the intertropical convergence zone, easterly waves, electrical discharges (lightning), mountain waves, jet streams, and fronts.

A tornado is a violently rotating column of air within, and extending from, a cumulonimbus. Tornadoes are usually observable as a funnel cloud or vortex ranging in diameter from about 100 feet to 1 mile. Tornadoes rotate cyclonically at very high speed and contain extreme turbulence and very low barometric pressure.

Tropical cyclones are characterized by an eye surrounded by a ring or wall of clouds (called wall cloud) and inward-oriented spiral bands. The greatest turbulence is found in the wall cloud. In an intense hurricane or typhoon, the wall cloud heights can reach 75,000 feet, and heights of 50,000 to 60,000 feet are common. Reports from jet hurricane reconnaissance flights indicate a considerable variation in turbulence between storms and altitudes. At times severe turbulence is encountered as high as 40,000 feet as well as at lower levels.

A prefrontal squall line is an instability line located in the warm sector of a cyclone, about 50 to 300 miles in advance of a cold front, usually oriented roughly parallel to the cold front and moving in the same manner as the cold front. However, at times squall lines develop at right angles to west-east warm or stationary fronts. Often thunderstorm activity and turbulence are more severe along a prefrontal squall line than that associated with the accompanying front to the west of the squall line.

The intertropical convergence zone, sometimes called the "Intertropical" or "Tropical Front," is a zone of convergence between the trade winds of the Northern and Southern Hemispheres or between trades of one hemisphere and the recurved trades (monsoons) of the other. The intertropical convergence zone migrates seasonally toward the summer hemisphere and lags one or two months behind the sun. Periodically waves develop along the intertropical convergence zone and move from east to west. Weather conditions along the intertropical convergence zone may create cumulonimbus clouds in a solid line that may extend from 1000 feet above the surface to more than 50,000 feet.

The easterly wave is a zone of convergence generally oriented in the NNE to SSW direction, moving from east to west in tropical regions. Easterly waves are encountered during the late spring, summer, and early fall. The easterly waves can generate cumulonimbus activity, severe squall and thunderstorm activity with associated severe turbulence over a relatively widespread area at varying altitudes. Quite often, intense easterly waves develop into hurricanes.

Electrical discharges (lightning) may occur in the atmosphere because of large variations in electrical potentials within a cloud, between adjacent clouds, or between clouds and the earth or other objects. Most intense electrical discharges are directly related to the separation of negative and positive charges by convective currents. Approximately 80 percent of observed discharges on aircraft have occurred while the aircraft were flying near the freezing level in convective-type clouds.

A mountain wave, sometimes called a "standing wave," is a disturbance in the atmosphere set up by a mountain barrier and characterized by a wave-like airflow producing strong currents and severe turbulence. The most turbulent area of a mountain wave is centered around the roll cloud at levels mainly below 20,000 feet. When jet-stream conditions are present, there is a layer of severe turbulence at the tropopause level. While the laminar flow between the lenticular clouds may consist of only moderate updrafts and downdrafts, it may break down into eddies, producing severe turbulence in the whole layer from the surface to the tropopause.

One study indicates that 85% of turbulence reported by aircraft is in some way related to jet streams. Although this includes cases classified as "light" and "moderate," and doubtless the percentage would be much lower in the "severe" category, the fact remains that jet streams are a very significant factor in the cause of severe turbulence. Jet streams cause turbulence when there are large amounts of horizontal wind shear, when there are large amounts of vertical wind shear, when a jet stream blows across a land barrier, or when two merged jet streams diverge. The effect of vertical wind shear is to produce the greatest amount of turbulence just above the core level of the jet stream where the tropopause, on the "high pressure" side of the jet stream, is close to the jet stream core. Another predominant region of turbulence is in the frontal region below the core of the jet stream. Both of these areas represent the maximum vertical wind shear. It is difficult to avoid jet stream turbulence in flight, especially in clear air, ergo "clear air turbulence."

Fronts are boundaries between air masses of different properties. Fronts on a vertical plane slope in the direction of the cold air. Although the steeper cold fronts usually produce more violent cloud activity and draft-type turbulence, the wind shears and associated gust-type turbulence may be just as great in the warm front. Very strong directional shear is present in levels below 10,000 feet in both the cold and warm frontal boundaries and cause considerable turbulence.

It is apparent that weather plays an important factor in determining turbulence. Turbulence occurs at specific altitudes and when encountered can greatly effect the operational factors of the aircraft especially in the form of fuel consumption.

Another factor influenced by altitude, is the freezing point of the fuel. The freezing point of the fuel can become a problem on long-duration high-altitude flights where fuel can freeze and cause engine starvation. On medium and long flights, the minimum fuel tank temperature does not necessarily occur at the top of descent. Enroute air masses containing temperatures well below standard values can cause the coldest tank temperatures to occur during the cruise phase. The fuel temperature must be monitored carefully to ascertain when it has dropped below a minimum temperature limit. If indications are present that the minimum temperature limits will be exceeded, then preventive action is required before the fuel temperature becomes critical. Fuel temperature can be increased, if necessary, by increasing the cruise Mach number, by reducing the altitude, or by diverting to a warmer track.

Numerous innovations for weather determining devices have been provided in the prior art that will be described. However, even though these innovations may be suitable for the specific individual purposes to which they address, they differ from the present invention in that they do not teach an onboard aircraft flight path optimization system that includes an onboard performance management system computer, an onboard pilot keyboard for inputting the coordinates of a remote position, an onboard weather radar for determining the wind at the remote position, an onboard inertial navigation system for determining the local wind, an onboard infrared probe for determining the temperature at the remote position, and an onboard temperature probe for determining the local temperature wherein the onboard performance management system computer constantly compares the remote position wind with the local wind and constantly compares the remote position temperature with the local temperature so as to provide the most economical flight path to a destination.

For example, Lebrun U.S. Pat. No. 4,281,383 teaches a process and system for the detection of a wind gradient or change for an aircraft. The system includes a first subtractor. A derivator connected to the first subtractor and generating a first subtractor signal received by a second subtractor. The second subtractor in combination with a third subtractor generates a third subtractor signal amplified by an amplifier.

Another example, Keedy U.S. Pat. No. 5,105,191 teaches an apparatus and method for detecting and indicating severe weather conditions such as wind shear and clear air turbulence. The system includes a sensor for detecting the weather parameter of air temperature differential and a computer for comparing the parameter value with a stored constant value. When the parameter value exceeds the constant value, a severe weather condition warning indication is generated by the computer as a visual and/or audio signal.

Still another example, Even-Tov U.S. Pat. No. 5,281,815 teaches a method for determining the humidity and temperature of atmospheric air at selected distances along a field of view by passive infrared spectrometry. A plurality of infrared power density values received by an infrared spectrometer along the field of view at a plurality of discrete, selected infrared wavelengths are measured.

Finally, yet another example, Barrett U.S. Pat. No. 5,285,070 teaches an apparatus for remotely sensing changes in the spatial temperature profile of a column of atmospheric air. The apparatus includes collecting means for receiving the thermal radiation from a column of atmospheric air and for directing it to intensity sensing means. Sensing means with rotatively mounted interference bandpass filter together with means for rotating the filter sequentially turns to and senses the intensity in the column of atmospheric air of at least two spatial regions in the 4.17 to 4.2 um region of the carbon dioxide spectral emission band. Means detect temporal changes in the relative intensity of the spectral regions.

It is apparent that numerous innovations for weather determining devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a onboard aircraft flight path optimization system that avoids the disadvantages of the prior art.

Another object of the present invention is to provide a onboard aircraft flight path optimization system that is simple to use.

Still another object of the present invention is to provide a onboard aircraft flight path optimization system that indicates the least head wind altitude.

Yet another object of the present invention is to provide a onboard aircraft flight path optimization system that increases nautical miles per 1000 lbs. of fuel.

Still yet another object of the present invention is to provide a onboard aircraft flight path optimization system that saves fuel for economy and insures against the need for possible diversion to alternate airports.

Yet still another object of the present invention is to provide a onboard aircraft flight path optimization system that would provide a substantial savings for long range operations by indicating to the pilot actual remote spot winds and temperatures, eliminating guess work.

Still yet another object of the present invention is to provide a onboard aircraft flight path optimization system that identify the many vagrancies of jet streams and winds aloft that can not be identified by forecast charts and pilot reports.

Yet still another object of the present invention is to provide a onboard aircraft flight path optimization system that considers the freeze point of the fuel in its computations.

Briefly stated, still yet another object of the present invention is to provide a onboard aircraft flight path optimization system that includes an onboard performance management computer, an onboard control display unit, an onboard infrared probe, an onboard temperature probe, an onboard weather radar, an onboard inertial navigation system, and onboard comparing apparatus.

Yet still another object of the present invention is to provide a onboard aircraft flight path optimization system wherein the onboard control display unit inputs a position remote from an aircraft into the onboard performance management computer.

Still yet another object of the present invention is to provide a onboard aircraft flight path optimization system wherein the onboard infrared probe determines temperature at the position remote from the aircraft and generates a remote temperature signal received by the onboard performance management computer.

Yet still another object of the present invention is to provide a onboard aircraft flight path optimization system wherein the onboard temperature probe determines temperature at the aircraft and generates a local temperature signal received by the onboard performance management computer.

Still yet another object of the present invention is to provide a onboard aircraft flight path optimization system wherein the onboard weather radar determines wind at the position remote from the aircraft and generates a remote wind signal received by the onboard performance management computer.

Yet still another object of the present invention is to provide a onboard aircraft flight path optimization system wherein the onboard inertial navigation system determines wind at the aircraft and generates a local wind signal received by the onboard performance management computer.

Still yet another object of the present invention is to provide a onboard aircraft flight path optimization system wherein the onboard comparing apparatus is disposed in the onboard performance management computer and compares the remote wind signal with the local wind signal and compares the remote temperature signal with the local temperature signal so as to determine the position remote from the aircraft where the remote wind signal is less than the local wind signal so that an altitude can be achieved that has less head wind and is therefore more economically efficient.

Yet still another object of the present invention is to provide a onboard aircraft flight path optimization system wherein the onboard control display unit includes an onboard pilot keyboard for inputting the position remote from the aircraft.

Still yet another object of the present invention is to provide a onboard aircraft flight path optimization system wherein the onboard weather radar is a dual radar system that includes backup protection against a single system failure.

Yet still another object of the present invention is to provide a onboard aircraft flight path optimization system wherein the onboard weather radar is a doppler weather surveillance radar system designed to provide early weather detection of wind shear and turbulence.

Still yet another object of the present invention is to provide a onboard aircraft flight path optimization system wherein the onboard weather radar calculates both the speed and direction of the wind at the position remote from the aircraft.

Yet still another object of the present invention is to provide a onboard aircraft flight path optimization system wherein the onboard weather radar detects the speed and the direction of the wind at the position remote from the aircraft up to a range of 300 nm.

Still yet another object of the present invention is to provide a onboard aircraft flight path optimization system wherein the onboard weather radar detects the speed and the direction of the wind at the position remote from the aircraft over a scan angle of at least 170 degrees.

Yet still another object of the present invention is to provide a onboard aircraft flight path optimization system wherein the onboard weather radar provides terrain display to detect rough terrain turbulence.

Still yet another object of the present invention is to provide a onboard aircraft flight path optimization system wherein the onboard weather radar includes a pencil antenna beam for terrain display at altitudes above 25,000 feet and an elongated antenna beam for terrain display at altitudes below 25,000 feet.

Yet still another object of the present invention is to provide a onboard aircraft flight path optimization system wherein the onboard comparing means compares the remote wind signal with the local wind signal and compares the remote temperature signal with the local temperature signal at intervals of 50 nautical miles.

Still yet another object of the present invention is to provide a onboard aircraft flight path optimization system wherein the onboard weather radar detects clear air turbulence.

Yet still another object of the present invention is to provide a onboard aircraft flight path optimization system wherein the onboard weather radar detects clear air turbulence by receiving scattering from conglomerates of small targets concentrated at specific locations in the atmosphere in a range corresponding to the top of the planetary boundary layer.

Still yet another object of the present invention is to provide a onboard aircraft flight path optimization system wherein the scattering is visualized as a reflection provided by a mismatch in the atmosphere caused by a change in refractive index of the atmosphere and whose fluctuations are a direct measure of the air motion.

Yet still another object of the present invention is to provide a onboard aircraft flight path optimization system that further includes an onboard clear air turbulence alert computer.

Still yet another object of the present invention is to provide a onboard aircraft flight path optimization system wherein the onboard clear air turbulence alert computer receives a clear air turbulence signal generated by the onboard weather radar when the onboard weather radar detects clear air turbulence and generates a clear air turbulence alert signal.

Yet still another object of the present invention is to provide a onboard aircraft flight path optimization system that further includes an onboard clear air turbulence computer alert.

Still yet another object of the present invention is to provide a onboard aircraft flight path optimization system wherein the onboard clear air turbulence computer alert illuminates when the onboard clear air turbulence computer alert receives the clear air turbulence alert signal.

Yet still another object of the present invention is to provide a onboard aircraft flight path optimization system wherein the onboard performance management system computer stores all performance data and engines tables for the aircraft.

Still yet another object of the present invention is to provide a onboard aircraft flight path optimization system wherein the onboard performance management system computer is coupled to the autopilot, the flight director, and the autothrottle of the aircraft for making automatic corrections in flight path.

Yet still another object of the present invention is to provide a onboard aircraft flight path optimization system wherein the onboard performance management system computer is in a normal autopilot altitude hold and the autothrottle controls speed according to a cruise option used when engaged in a cruise mode.

Still yet another object of the present invention is to provide a onboard aircraft flight path optimization system wherein the onboard performance management system computer biases the normal autopilot altitude hold to permit an altitude drift of plus or minus 120 feet to minimize throttle hunt.

Yet still another object of the present invention is to provide a onboard aircraft flight path optimization system wherein the onboard control display unit further includes an onboard pilot readout.

Still yet another object of the present invention is to provide a onboard aircraft flight path optimization system wherein the onboard pilot readout is an electronic CRT that displays a first line of alphanumeric text, a second line of alphanumeric text, and a third line of alphanumeric text which together comprise three lines of selected information which can be selectively changed.

Yet still another object of the present invention is to provide a onboard aircraft flight path optimization system wherein the onboard control display unit further includes a first onboard display line switch to select the first line of alphanumeric text for data entry and text change.

Still yet another object of the present invention is to provide a onboard aircraft flight path optimization system wherein the onboard control display unit further includes a second onboard display line switch to select the second line of alphanumeric text for data entry and text change.

Yet still another object of the present invention is to provide a onboard aircraft flight path optimization system wherein the onboard control display unit further includes a third onboard display line switch to select the third line of alphanumeric text for data entry and text change.

Still yet another object of the present invention is to provide a onboard aircraft flight path optimization system wherein the onboard pilot keyboard consists of 10 keys and permits data insertion onto a selected one of the first line of alphanumeric text, the second line of alphanumeric text, and the third line of alphanumeric text.

Yet still another object of the present invention is to provide a onboard aircraft flight path optimization system wherein the onboard control display unit further includes an onboard insert key.

Still yet another object of the present invention is to provide a onboard aircraft flight path optimization system wherein the onboard insert key is pressed to enter the first line of alphanumeric text, the second line of alphanumeric text, and the third line of alphanumeric text.

Yet still another object of the present invention is to provide a onboard aircraft flight path optimization system wherein the onboard insert key illuminates when pressed and is extinguished when the first line of alphanumeric text, the second line of alphanumeric text, and the third line of alphanumeric text are entered into the onboard performance management system computer.

Still yet another object of the present invention is to provide a onboard aircraft flight path optimization system wherein the onboard control display unit further includes an onboard climb light, an onboard cruise light, and an onboard descent light to indicate flight mode of the onboard performance management system computer.

Yet still another object of the present invention is to provide a onboard aircraft flight path optimization system wherein the onboard control display unit further includes an onboard climb key to display climb data and permit insertion of climb commands.

Still yet another object of the present invention is to provide a onboard aircraft flight path optimization system wherein the onboard control display unit further includes an onboard cruise key to display cruise data and permit insertion of cruise speed commands.

Yet still another object of the present invention is to provide a onboard aircraft flight path optimization system wherein the onboard control display unit further includes an onboard descent key to display descent data and permit insertion of decent rates and speeds.

Still yet another object of the present invention is to provide a onboard aircraft flight path optimization system wherein the onboard control display unit further includes an onboard planning key to display planning data and permit configuration selection, preflight data insertion and step climb data.

Yet still another object of the present invention is to provide a onboard aircraft flight path optimization system wherein the onboard control display unit further includes an onboard status light that indicates performance management system computer malfunction.

Still yet another object of the present invention is to provide a onboard aircraft flight path optimization system wherein the onboard control display unit further includes an onboard clear key to clear erroneous data if the onboard insert key has not been pressed.

Yet still another object of the present invention is to provide a onboard aircraft flight path optimization system wherein the onboard control display unit further includes an onboard forward back slew switch to cycle additional data onto the onboard pilot readout.

Still yet another object of the present invention is to provide a onboard aircraft flight path optimization system wherein the onboard control display unit further includes an onboard test switch to produce uniform squares on the onboard pilot readout.

Yet still another object of the present invention is to provide a onboard aircraft flight path optimization system wherein the onboard inertial navigation system when activated by the onboard pilot keyboard, produces an aiming signal for aiming the onboard weather radar and the onboard infrared probe.

Still yet another object of the present invention is to provide a method of using an onboard aircraft flight path optimization system that includes the steps of pressing manually a first onboard display line switch of an onboard control display unit of the onboard aircraft flight optimization system, entering manually, via an onboard pilot keyboard of the onboard control display unit, a selected N, S, E, or W coordinates of a remote position for which routing analysis is desired into an onboard performance management system computer of the onboard aircraft flight optimization system, appearing automatically the selected N, S, E, or W, coordinates of the remote position as a first line of alphanumeric text on an onboard pilot readout of the onboard control display unit, pressing manually a second onboard display line switch of the onboard control display unit, entering manually, via the onboard pilot keyboard, a selected flight level altitude of the remote position for which routing analysis is desired into the onboard performance management system computer, appearing automatically the selected flight level altitude of the remote position as a second line of alphanumeric text on the onboard pilot readout, instructing automatically, via the onboard performance management system computer, an onboard inertial navigation system of the onboard aircraft flight optimization system to produce an aiming signal, receiving automatically the aiming signal by a weather radar of the onboard aircraft flight optimization system and an onboard infrared probe of the onboard aircraft flight optimization system, aiming automatically the onboard weather radar and the onboard infrared probe towards the remote position for which routing analysis is desired, determining automatically a remote wind measurement at the remote position by the onboard weather radar and the onboard inertial navigation system, sending automatically the remote wind measurement to the onboard performance management system computer, determining automatically a remote temperature measurement at the remote position by an onboard infrared probe of the onboard aircraft flight optimization system, sending automatically the remote temperature measurement to the onboard performance management system computer, displaying automatically the remote wind measurement and the remote temperature measurement as a third line of alphanumeric text of the onboard pilot readout, determining a local temperature measurement by an onboard temperature probe of the onboard aircraft flight optimization system, sending automatically the local temperature measurement to the onboard performance management system computer, determining a local wind measurement by the onboard inertial navigation system, sending automatically the local wind measurement to the onboard performance management system computer, comparing automatically, by the onboard management system computer, the remote wind measurement with the local wind measurement which are automatically updated every 50 nautical miles to seek and determine a most efficient cruise level having least head wind and turbulence, comparing automatically, by the onboard performance management system computer, the remote temperature measurement with the local temperature measurement which are automatically updated every 50 nautical miles, and determining automatically a most efficient cruise level within bounds of fuel freeze point.

Yet still another object of the present invention is to provide a method of using an onboard aircraft flight path optimization system that further includes the step of feeding automatically the most efficient cruise level, by the onboard performance management system computer, to an onboard autopilot of the onboard aircraft flight optimization system and an autothrottle of the onboard aircraft flight optimization system for automatic execution.

Still yet another object of the present invention is to provide a method of using an onboard aircraft flight path optimization system that further includes the step of displaying the most efficient cruise level for inspection.

Yet still another object of the present invention is to provide a method of using an onboard aircraft flight path optimization system that further includes the step of programming an onboard clear air turbulence computer of the onboard aircraft flight optimization system to automatically determine when the onboard weather radar detects an atmospheric refraction rate indicative of clear air turbulence and to also automatically determine when the remote temperature measurement is different than that of the jet stream which is also indicative of clear air turbulence.

Finally, still yet another object of the present invention is to provide a method of using an onboard aircraft flight path optimization system that further includes the step of illuminating an onboard clear air turbulence computer alert by the onboard clear air turbulence computer.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the various altitudes for an airplane to partition an optimal flight path therewithin;

FIG. 2 is a diagrammatic side elevational view thereof;

FIG. 3 is a diagrammatic top plan view of an airplane showing both the outer locus of all flight paths and the area in which an onboard radar would scan;

Figure 4:
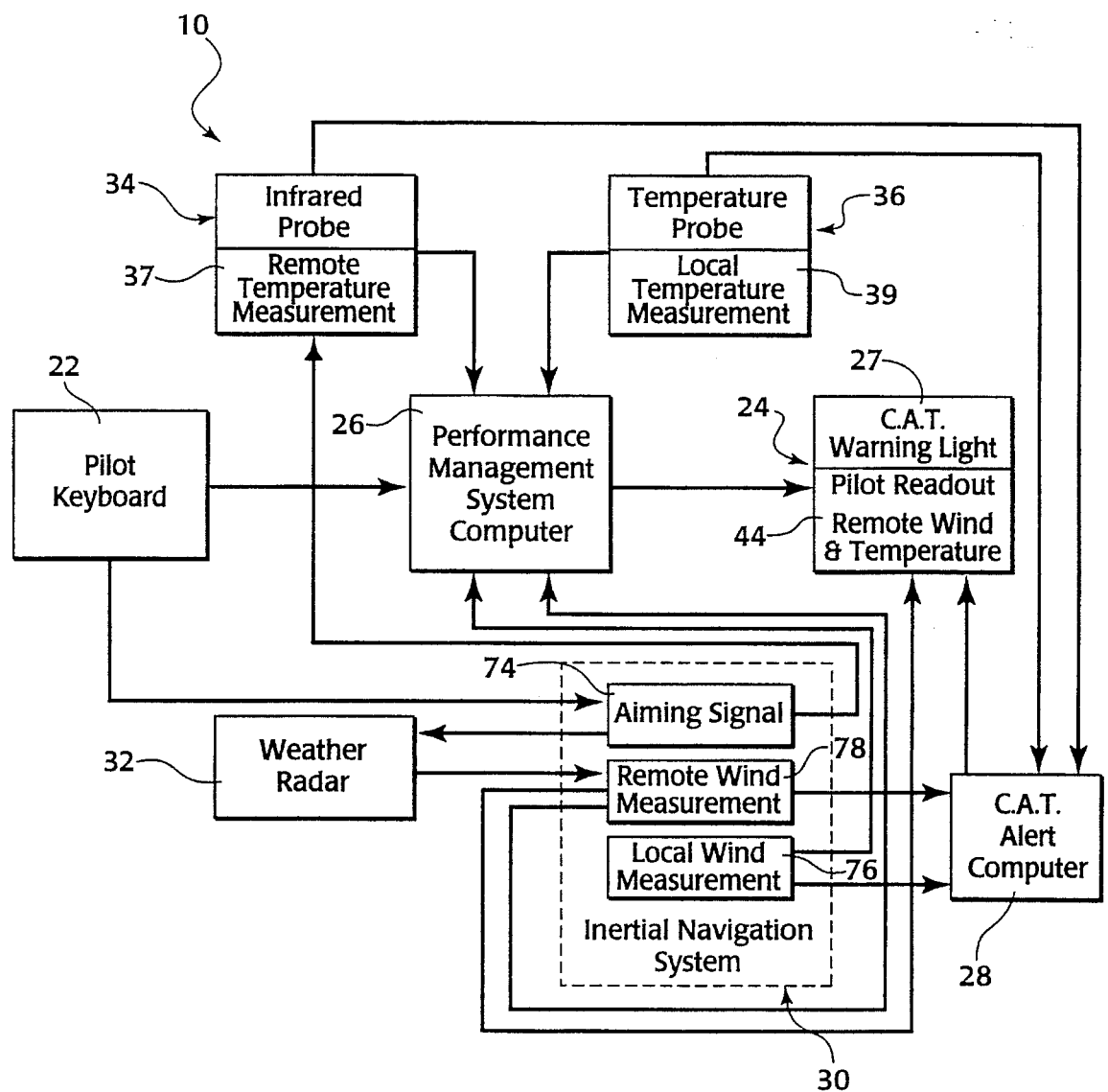
FIG. 4 is a block diagram illustrating the interface of the various components of the present invention.

List of Reference Numerals Utilized in the Drawing 10 onboard aircraft flight path optimization system of the present invention
12 aircraft 12
14 plurality of altitudes
16 plurality of potential flight paths
18 designation
20 onboard radar scan area
22 onboard pilot keyboard
24 onboard pilot readout
26 onboard performance management system computer
27 onboard clear air turbulence (CAT) computer alert
28 onboard clear air turbulence alert computer
30 onboard inertial navigation system
32 onboard weather radar
34 onboard infrared probe
35 onboard control display unit
36 onboard temperature probe
37 remote temperature measurement
39 local temperature measurement
40 first line of alphanumeric text
42 second line of alphanumeric text
44 third line of alphanumeric text
46 first onboard display line switch
48 second onboard display line switch
50 third onboard display line switch
52 onboard climb (CLB) light
53 onboard INSERT key
54 onboard cruise (CRZ) light
56 onboard descent (DES) light
58 onboard CLB key
60 onboard CRZ key
62 onboard DES key
64 onboard PLING key
66 onboard status (STS) light
68 onboard CLEAR key
70 onboard forward/back (FWD/BCK) slew switch
72 onboard TEST switch
74 aiming signal
76 local wind measurement
78 remote wind measurement

DETAILED DESCRIPTION OF THE PREFERRED EMBODIMENT

Referring now to the figures in which like numerals indicate like parts, and particularly to FIGS. 1 to 3, the onboard aircraft flight path optimization system of the present invention is shown generally at 10 being used on an aircraft 12.

As shown in FIGS. 1 and 2, the aircraft 12 can achieve a plurality of altitudes 14 so as to obtain an optimum flight path.

As shown in FIG. 3, the aircraft 12 can achieve a plurality of potential flight paths 16 to a designation 18 with an onboard radar scan area 20 superimposed thereon.

The configuration and operation of the onboard aircraft flight path optimization system 10 can best be seen in FIGS. 4 and 5, and as such, will be discussed with reference thereto. 14 As shown in FIG. 4, the onboard aircraft flight path optimization system 10 includes an onboard pilot keyboard 22, an onboard pilot readout 24, an onboard performance management system computer 26, an onboard clear air turbulence alert computer 28, an onboard clear air turbulence (CAT) computer alert 27, an onboard inertial navigation system 30, an onboard weather radar 32, an onboard infrared probe 34, and an onboard temperature probe 36.

The onboard weather radar 32 is a dual radar system including backup protection against a single system failure. The onboard weather radar 32 obtains weather information that is more detailed and more useful than weather information received from ground controllers.

The onboard weather radar 32 is a doppler weather surveillance radar system designed to provide early weather detection such as but not limited to wind shear, penetration, and avoidance—even for short lived often catastrophic weather events such as tornadoes.

The onboard weather radar 32 calculates both the speed and direction of motion of severe storms. By providing data on the wind patterns within developing storms, the onboard weather radar 32 can identify the conditions leading to a tornado. This includes earlier detection of the precursors to tornadoes, as well as data on the direction and speed of tornadoes once they form. The incorporation of an advanced algorithm creates better detection of dry microbursts.

Cloud targets and storms can be located in ranges up to 300 nm, and in relative bearing over a scan angle of approximately 170 degrees. An offset feature on the indicator is provided, however, to enable viewing to the right or left of the ahead position.

Terrain mapping is provided to aid identification of coastlines, rivers, mountains and other terrain features in an effort to avoid rough terrain turbulence. In addition to the characteristic pencil beam, available for ground mapping at higher altitudes, a reshaped (elongated) antenna beam is provided for terrain display, when ground mapping at altitudes below 25,000 feet.

Hail, turbulence, and lightning are the principle weather detractions from safe, comfortable, economical flight. The display (not shown) of the onboard weather radar 32 can show the storm with which these conditions are associated.

Since the development of a thunderstorm target can change radically from the time it is first detected at maximum range to the time when the airplane is in the vicinity, the onboard weather radar 32 constantly updates information.

The onboard weather radar 32 provides the only means of indicating the detour necessary around thunderstorms to minimize the probability of lightning strike, hail, related turbulence, and excess fuel consumption.

The onboard weather radar 32 can detect clear air turbulence by receiving scattering from conglomerates of small targets concentrated at specific locations in the atmosphere in a range corresponding to the top of the planetary boundary layer. The scattering mechanism can be visualized as a reflection due to a mismatch in the atmosphere caused by a change in refractive index of the medium whose fluctuations are a direct measure of the air motion.

The clear air turbulence detected by the onboard weather radar 32 produces a clear air turbulence signal that is feed into the onboard clear air turbulence alert computer 28 where a clear air turbulence alert signal is feed into the onboard control display unit 35 and the onboard clear air turbulence (CAT) computer alert 27 is illuminated.

The onboard performance management system computer 26 provides a means of computing various operating parameters for controlling flight as economically as possible, i.e., conserving fuel. All airplane performance data and engines tables are stored in the onboard performance management system computer 26. The onboard performance management system computer 26 is coupled to the autopilot, the flight director, and the autothrottle for making automatic corrections in flight path.

The onboard performance management system computer 26 is engaged in the cruise mode and the normal autopilot altitude hold is used in pitch and the autothrottle system controls speed according to the cruise option used. When controlling air speed during cruise, the onboard performance management system computer 26 biases the autopilot altitude hold channel to permit an altitude drift of plus or minus 120 feet to minimize throttle hunt.

An onboard control display unit 35 provides the means of controlling and monitoring the onboard performance management system computer 26. All system input, computation, and data display functions are controlled from the onboard control display unit 35.

Figure 5:
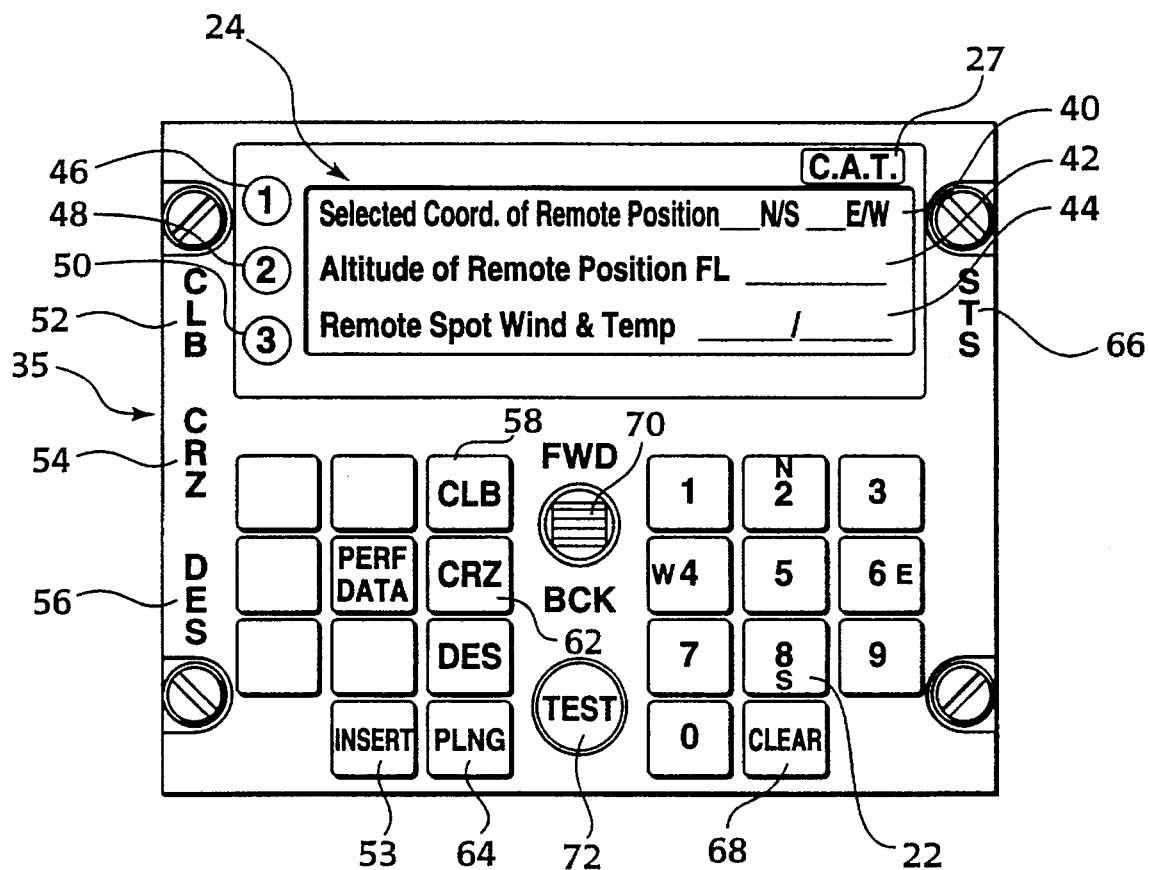
FIG. 5 is a diagrammatic front elevational view of the control display unit of the present invention.

As shown in FIG. 5, the onboard control display unit 35 consists of keyboard controls, illuminated status annunciators, and includes among other things, the onboard pilot keyboard 22 and the onboard pilot readout 24.

The onboard pilot readout 24 is an electronic CRT that displays a first line of alphanumeric text 40, a second line of alphanumeric text 42, and a third line of alphanumeric text 44 which together comprise three lines of selected information which can be individually changed.

A first onboard display line switch 46, a second onboard display line switch 48 and a third onboard display line switch 50 are provided to reference a respective one of the first line of alphanumeric text 40, the second line of alphanumeric text 42, and the third line of alphanumeric text 44 for data entry or text changes.

The onboard pilot keyboard 22 consists of 10 keys and is used to load data before insertion. The onboard pilot keyboard 22 permits data insertion onto a selected one of the first line of alphanumeric text 40, the second line of alphanumeric text 42, and the third line of alphanumeric text 44.

When the desired data is entered onto the first line of alphanumeric text 40, the second line of alphanumeric text 42, and/or the third line of alphanumeric text 44, pressing an onboard INSERT key 53 illuminates same and enters the data into the onboard performance management system computer 26. The illuminated onboard INSERT key 53 is extinguished when the onboard INSERT key 53 when accepted.

An onboard climb (CLB) light 52, an onboard cruise (CRZ) light 54, and an onboard descent (DES) light 56 indicate the flight mode of the onboard performance management system computer 26.

An onboard CLB key 58 displays climb data and permits insertion of climb commands.

An onboard CRZ key 60 displays cruise data and permits insertion of cruise speed commands.

An onboard DES key 62 displays descent data and permits insertion of decent rates and speeds.

An onboard PLING key 64 displays planning data and permits configuration selection, preflight data insertion and step climb data.

An onboard status (STS) light 66 indicates performance management system computer 26 malfunction.

An onboard CLEAR key 68 is pressed to clear erroneous data if the onboard INSERT key 53 has not been pressed.

An onboard forward/back (FWD/BCK) slew switch 70 cycles additional data onto the onboard pilot readout 24.

An onboard TEST switch 72, when pressed, produces uniform squares on the onboard pilot readout 24.

The onboard inertial navigation system 30 automatically solves navigation problems by sensing airplane acceleration, starting from an accurately inserted present position. Acceleration is sensed by a platform unit which is also the attitude reference for the flight instruments and airplane systems that require altitude data.

The onboard infrared probe 34 is used to determine remote temperature and produces a remote temperature measurement 37 while the onboard temperature probe 36 is used to determine local temperature and produces a local temperature measurement 39.

The onboard inertial navigation system 30 when activated by the onboard pilot keyboard 22, produces an aiming signal 74 for aiming the onboard weather radar 32 and the onboard infrared probe 34. Additionally, the onboard inertial navigation system 30 is used to determine local wind measurement 76 and receives signals from the onboard weather radar 32 to determine remote wind measurement 78.

In operation, a user presses the first onboard display line switch 46 on the onboard control display unit 35.

The user then, via the onboard pilot keyboard 22, enters the selected coordinates N, S, E, or W of the remote position for which routing analysis is desired into the onboard performance management system computer 26. The selected coordinates N, S, E, or W of the remote position automatically appear as the first line of alphanumeric text 40 on the onboard pilot readout 24.

The user then presses the second onboard display line switch 48 on the onboard control display unit 35.

The user then, via the onboard pilot keyboard 22, enters the altitude (FL) of the remote position for which routing analysis is desired into the onboard performance management system computer 26. The altitude (FL) of the remote position automatically appears as the second line of alphanumeric text 42 on the onboard pilot readout 24.

The onboard management system computer 26 then automatically instructs the onboard inertial navigation system 30 to produce the aiming signal 74 which is automatically received by the onboard weather radar 32 and the onboard infrared probe 34.

The onboard weather radar 32 and the onboard infrared probe 34 are then automatically aimed in the direction of the remote position for which routing analysis is desired.

The onboard weather radar 32 in conjunction with the onboard inertial navigation system 30 automatically determine the remote wind measurement 78 and automatically send the respective signal to the onboard management system computer 26.

The onboard infrared probe 34 automatically determines the remote temperature measurement 37 and automatically sends the respective signal to the onboard management system computer 26.

The remote wind measurement 78 and the remote temperature measurement 37 are automatically displayed as the third line of alphanumeric text 44.

The local temperature measurement 39 determined by the onboard temperature probe 36 is automatically sent to the onboard management system computer 26.

The local wind measurement 76 determined by the onboard inertial navigation system 30 is automatically sent to the onboard management system computer 26.

The onboard management system computer 26 automatically compares the remote wind measurement 78 with the local wind measurement 76, which are automatically updated every 50 nautical miles, to seek and determine the most efficient cruise level (least head wind and turbulent flight level or altitude).

The onboard management system computer 26 also automatically compares the remote temperature measurement 37 with the local temperature measurement 39, which are also automatically updated every 50 nautical miles, to assist in further determining a more efficient cruise level.

Temperature comes into play since the ratio of temperature to fuel economy (expressed in nautical miles per 1000 lbs. of fuel) essentially remains the same for a given altitude, regardless of temperature. Also for temperature above standard, both the true air speed (TAS) and fuel flow increase in approximately the same proportion, resulting in no change in miles per pound of fuel. But high temperatures will reduce the maximum cruise thrust available and will therefore, at some critical temperature, limit the altitude which can be selected.

Additionally, in determining the most efficient cruise level, the onboard performance management system computer 26 automatically considers in its computations the attitude limit governed by the fuel freeze point and the temperature and wind flight plan limits.

Once the optimum flight path is automatically determined by the onboard performance management system computer 26, it is fed to the autopilot and autothrottle for execution or may displayed for pilot inspection.

The onboard clear air turbulence computer 28 is programmed to automatically determine when the onboard weather radar 32 detects an atmospheric refraction rate indicative of clear air turbulence and to also automatically determine when the remote temperature measurement 37 is different than that of the jet stream which is also indicative of clear air turbulence. When either determination is made, the onboard clear air turbulence computer 28 will cause the onboard clear air turbulence (CAT) computer alert 27 to illuminate.

It will be understood that each of the elements described above, or two or more together, may also find a useful application in other types of constructions differing from the types described above.

While the invention has been illustrated and described as embodied in a onboard aircraft flight path optimization system, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An onboard aircraft flight optimization system, comprising:
   a) an onboard performance management computer;
   b) an onboard control display unit for inputting a position remote from an aircraft into said onboard performance management computer;
   c) an onboard infrared probe for determining temperature at the position remote from the aircraft and generating a remote temperature signal received by said onboard performance management computer;
   d) an onboard temperature probe for determining temperature at the aircraft and generating a local temperature signal received by said onboard performance management computer;
   e) an onboard weather radar for determining wind at the position remote from the aircraft and generating a remote wind signal received by said onboard performance management computer;
   f) an onboard inertial navigation system for determining wind at the aircraft and generating a local wind signal received by said onboard performance management computer; and
   g) onboard comparing means disposed in said onboard performance management computer for comparing said remote wind signal with said local wind signal and comparing said remote temperature signal with said local temperature signal so as to determine the position remote from the aircraft where said remote wind signal is less than said local wind signal so that an altitude can be achieved that has less head wind and is therefore more economically efficient.

2. The system as defined in claim 1, wherein said onboard control display unit includes an onboard pilot keyboard for inputting the position remote from the aircraft.

3. The system as defined in claim 2, wherein said onboard weather radar is a dual radar system that includes backup protection against a single system failure.

4. The system as defined in claim 3, wherein said onboard weather radar is a doppler weather surveillance radar system designed to provide early weather detection of wind shear and turbulence.

5. The system as defined in claim 4, wherein said onboard weather radar calculates both the speed and direction of the wind at the position remote from the aircraft.

6. The system as defined in claim 5, wherein said onboard weather radar detects the speed and the direction of the wind at the position remote from the aircraft up to a range of 300 nm.

7. The system as defined in claim 6, wherein said onboard weather radar detects the speed and the direction of the wind at the position remote from the aircraft over a scan angle of at least 170 degrees.

8. The system as defined in claim 7, wherein said onboard weather radar provides terrain display to detect rough terrain turbulence.

9. The system as defined in claim 8, wherein said onboard weather radar includes a pencil antenna beam for terrain display at altitudes above 25,000 feet and an elongated antenna beam for terrain display at altitudes below 25,000 feet.

10. The system as defined in claim 9, wherein said onboard comparing means compares said remote wind signal with said local wind signal and compares said remote temperature signal with said local temperature signal at intervals of 50 nautical miles.

11. The system as defined in claim 10, wherein said onboard weather radar detects clear air turbulence.

12. The system as defined in claim 11, wherein said onboard weather radar detects clear air turbulence by receiving scattering from conglomerates of small targets concentrated at specific locations in the atmosphere in a range corresponding to the top of the planetary boundary layer.

13. The system as defined in claim 12, wherein said scattering is visualized as a reflection provided by a mismatch in the atmosphere caused by a change in refractive index of the atmosphere and whose fluctuations are a direct measure of the air motion.

14. The system as defined in claim 13; further comprising an onboard clear air turbulence alert computer.

15. The system as defined in claim 14, wherein said onboard clear air turbulence alert computer receives a clear air turbulence signal generated by said onboard weather radar when said onboard weather radar detects clear air turbulence and generates a clear air turbulence alert signal.

16. The system as defined in claim 15; further comprising an onboard clear air turbulence computer alert.

17. The system as defined in claim 16, wherein said onboard clear air turbulence computer alert illuminates when said onboard clear air turbulence computer alert receives said clear air turbulence alert signal.

18. The system as defined in claim 17, wherein said onboard performance management system computer stores all performance data and engines tables for the aircraft.

19. The system as defined in claim 18, wherein said onboard performance management system computer is coupled to the autopilot, the flight director, and the autothrottle of the aircraft for making automatic corrections in flight path.

20. The system as defined in claim 19, wherein said onboard performance management system computer is in a normal autopilot altitude hold and the autothrottle controls speed according to a cruise option used when engaged in a cruise mode.

21. The system as defined in claim 20, wherein said onboard performance management system computer biases the normal autopilot altitude hold to permit an altitude drift of plus or minus 120 feet to minimize throttle hunt.

22. The system as defined in claim 21, wherein said onboard control display unit further includes an onboard pilot readout.

23. The system as defined in claim 22, wherein said onboard pilot readout is an electronic CRT that displays a first line of alphanumeric text, a second line of alphanumeric text, and a third line of alphanumeric text which together comprise three lines of selected information which can be selectively changed.

24. The system as defined in claim 23, wherein said onboard control display unit further includes a first onboard display line switch to select said first line of alphanumeric text for data entry and text change.

25. The system as defined in claim 24, wherein said onboard control display unit further includes a second onboard display line switch to select said second line of alphanumeric text for data entry and text change.

26. The system as defined in claim 25, wherein said onboard control display unit further includes a third onboard display line switch to select said third line of alphanumeric text for data entry and text change.

27. The system as defined in claim 26, wherein said onboard pilot keyboard consists of 10 keys and permits data insertion onto a selected one of said first line of alphanumeric text, said second line of alphanumeric text, and said third line of alphanumeric text.

28. The system as defined in claim 27, wherein said onboard control display unit further includes an onboard insert key.

29. The system as defined in claim 28, wherein said onboard insert key is pressed to enter said first line of alphanumeric text, said second line of alphanumeric text, and said third line of alphanumeric text.

30. The system as defined in claim 29, wherein said onboard insert key illuminates when pressed and is extinguished when said first line of alphanumeric text, said second line of alphanumeric text, and said third line of alphanumeric text are entered into said onboard performance management system computer.

31. The system as defined in claim 30, wherein said onboard control display unit further includes an onboard climb light, an onboard cruise light, and an onboard descent light to indicate flight mode of said onboard performance management system computer.

32. The system as defined in claim 31, wherein said onboard control display unit further includes an onboard climb key to display climb data and permit insertion of climb commands.

33. The system as defined in claim 32, wherein said onboard control display unit further includes an onboard cruise key to display cruise data and permit insertion of cruise speed commands.

34. The system as defined in claim 33, wherein said onboard control display unit further includes an onboard descent key to display descent data and permit insertion of decent rates and speeds.

35. The system as defined in claim 34, wherein said onboard control display unit further includes an onboard planning key to display planning data and permit configuration selection, preflight data insertion and step climb data.

36. The system as defined in claim 35, wherein said onboard control display unit further includes an onboard status light that indicates performance management system computer malfunction.

37. The system as defined in claim 36, wherein said onboard control display unit further includes an onboard clear key to clear erroneous data if the onboard insert key has not been pressed.

38. The system as defined in claim 37, wherein said onboard control display unit further includes an onboard forward back slew switch to cycle additional data onto said onboard pilot readout.

39. The system as defined in claim 38, wherein said onboard control display unit further includes an onboard test switch to produce uniform squares on said onboard pilot readout.

40. The system as defined in claim 39, wherein said onboard inertial navigation system when activated by said onboard pilot keyboard, produces an aiming signal for aiming said onboard weather radar and said onboard infrared probe.

41. A method of using an onboard aircraft flight optimization system, comprising the steps of:

a) pressing manually a first onboard display line switch of an onboard control display unit of said onboard aircraft flight optimization system;

b) entering manually, via an onboard pilot keyboard of said onboard control display unit, a selected N, S, E, or W coordinates of a remote position for which routing analysis is desired into an onboard performance management system computer of said onboard aircraft flight optimization system;

c) appearing automatically said selected N, S, E, or W coordinates of said remote position as a first line of alphanumeric text on an onboard pilot readout of said onboard control display unit;

d) pressing manually a second onboard display line switch of said onboard control display unit;

e) entering manually, via said onboard pilot keyboard, a selected flight level altitude of said remote position for which routing analysis is desired into said onboard performance management system computer;

f) appearing automatically said selected flight level altitude of said remote position as a second line of alphanumeric text on said onboard pilot readout;

g) instructing automatically, via said onboard performance management system computer, an onboard inertial navigation system of said onboard aircraft flight optimization system to produce an aiming signal;

h) receiving automatically said aiming signal by a weather radar of said onboard aircraft flight optimization system and an onboard infrared probe of said onboard aircraft flight optimization system;

i) aiming automatically said onboard weather radar and said onboard infrared probe towards said remote position for which routing analysis is desired;

j) determining automatically a remote wind measurement at said remote position by said onboard weather radar and said onboard inertial navigation system;

k) sending automatically said remote wind measurement to said onboard performance management system computer;

l) determining automatically a remote temperature measurement at said remote position by an onboard infrared probe of said onboard aircraft flight optimization system;

m) sending automatically said remote temperature measurement to said onboard performance management system computer;

n) displaying automatically said remote wind measurement and said remote temperature measurement as a third line of alphanumeric text of said onboard pilot readout;

o) determining a local temperature measurement by an onboard temperature probe of said onboard aircraft flight optimization system;

p) sending automatically said local temperature measurement to said onboard performance management system computer;

q) determining a local wind measurement by said onboard inertial navigation system;

r) sending automatically said local wind measurement to said onboard performance management system computer;

s) comparing automatically, by said onboard management system computer, said remote wind measurement with said local wind measurement which are automatically updated every 50 nautical miles to seek and determine a most efficient cruise level having least head wind and turbulence;

t) comparing automatically, by said onboard performance management system computer, said remote temperature measurement with said local temperature measurement which are automatically updated every 50 nautical miles; and u) determining automatically a most efficient cruise level within bounds of fuel freeze point.

42. The method as defined in claim 41; further comprising the step of feeding automatically said most efficient cruise level, by said onboard performance management system computer, to an onboard autopilot of said onboard aircraft flight optimization system and an autothrottle of said onboard aircraft flight optimization system for automatic execution.

43. The method as defined in claim 42; further comprising the step of displaying said most efficient cruise level for inspection.

44. The method as defined in claim 43; further comprising the step of programming an onboard clear air turbulence computer of said onboard aircraft flight optimization system to automatically determine when said onboard weather radar detects an atmospheric refraction rate indicative of clear air turbulence and to also automatically determine when the remote temperature measurement is different than that of the jet stream which is also indicative of clear air turbulence.

45. The method as defined in claim 44; further comprising the step of illuminating an onboard clear air turbulence computer alert by said onboard clear air turbulence computer.

* * * * *